US009769531B2

(12) United States Patent
Donlan et al.

(10) Patent No.: US 9,769,531 B2
(45) Date of Patent: Sep. 19, 2017

(54) METHOD AND APPARATUS FOR PROVISIONING CLIENT DEVICES CONNECTED TO AN INTERACTIVE TV NETWORK

(75) Inventors: Brian Joseph Donlan, Lynn Haven, FL (US); Randall G. Rushe, Panama City, FL (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 2192 days.

(21) Appl. No.: 10/287,330

(22) Filed: Nov. 4, 2002

(65) Prior Publication Data

US 2004/0088734 A1 May 6, 2004

(51) Int. Cl.
| | |
|---|---|
| *H04N 7/16* | (2011.01) |
| *H04N 7/173* | (2011.01) |
| *H04N 5/445* | (2011.01) |
| *H04N 21/475* | (2011.01) |
| *H04N 21/2543* | (2011.01) |
| *H04N 21/258* | (2011.01) |
| *H04N 21/478* | (2011.01) |
| *H04N 21/239* | (2011.01) |
| *H04N 21/643* | (2011.01) |

(52) U.S. Cl.
CPC ..... *H04N 21/4751* (2013.01); *H04N 7/17318* (2013.01); *H04N 21/239* (2013.01); *H04N 21/2543* (2013.01); *H04N 21/25866* (2013.01); *H04N 21/25875* (2013.01); *H04N 21/478* (2013.01); *H04N 21/64307* (2013.01); *H04N 21/64322* (2013.01)

(58) Field of Classification Search
USPC .... 725/25, 86, 105, 118, 148, 149, 37, 44, 9
See application file for complete search history.

(56) References Cited

U.S. PATENT DOCUMENTS

| | | | |
|---|---|---|---|
| 5,481,542 A | | 1/1996 | Logston et al. |
| 5,485,221 A | | 1/1996 | Banker et al. |
| 5,526,034 A | | 6/1996 | Hoarty et al. |
| 5,539,450 A | | 7/1996 | Handelman |
| 5,572,442 A | | 11/1996 | Schulhof et al. |
| 5,592,551 A | | 1/1997 | Lett et al. |
| 5,594,726 A | | 1/1997 | Thompson et al. |
| 5,600,364 A | * | 2/1997 | Hendricks et al. ............... 725/9 |

(Continued)

FOREIGN PATENT DOCUMENTS

| | | |
|---|---|---|
| WO | WO 02/67111 A2 | 2/2002 |
| WO | WO 02/79921 A2 | 3/2002 |
| WO | WO 02/88886 A2 | 4/2002 |

OTHER PUBLICATIONS

European Search Report Communication dated Mar. 9, 2004.
(Continued)

*Primary Examiner* — Nasser Goodarzi
*Assistant Examiner* — Fred Peng
(74) *Attorney, Agent, or Firm* — Banner & Witcoff, Ltd.

(57) ABSTRACT

A system and method manages the provisioning of an client device connected to a service distribution network, such as an interactive television service-providing network. Provisioning is managed by a provisioning manager that knows the specific provisioning data to collect and where the data is located and is to be forwarded. The client or subscriber can initiate the provisioning transaction through the client device.

28 Claims, 7 Drawing Sheets

(56) References Cited

U.S. PATENT DOCUMENTS

| | | | |
|---|---|---|---|
| 5,610,841 A | | 3/1997 | Tanaka et al. |
| 5,682,325 A | * | 10/1997 | Lightfoot et al. ............ 709/229 |
| 5,740,075 A | * | 4/1998 | Bigham et al. ............... 709/229 |
| 5,751,707 A | | 5/1998 | Voit et al. |
| 5,790,198 A | | 8/1998 | Roop et al. |
| 5,880,720 A | | 3/1999 | Iwafune et al. |
| 5,883,661 A | | 3/1999 | Hoarty |
| 5,892,508 A | | 4/1999 | Howe et al. |
| 5,930,231 A | | 7/1999 | Miller et al. |
| 6,002,394 A | | 12/1999 | Schein et al. |
| 6,014,184 A | | 1/2000 | Knee et al. |
| 6,041,056 A | | 3/2000 | Bigham et al. |
| 6,064,377 A | | 5/2000 | Hoarty et al. |
| 6,502,242 B1 | | 12/2002 | Howe et al. |
| 6,564,308 B2 | | 5/2003 | Mann |
| 6,615,408 B1 | | 9/2003 | Kaiser et al. |
| 6,738,982 B1 | | 5/2004 | Jerding |
| 6,792,615 B1 | * | 9/2004 | Rowe et al. .................... 725/37 |
| 6,826,775 B1 | | 11/2004 | Howe et al. |
| 7,134,131 B1 | * | 11/2006 | Hendricks et al. ............. 725/31 |
| 2002/0059586 A1 | | 5/2002 | Carney et al. |
| 2002/0099632 A1 | | 7/2002 | Yanagidate et al. |
| 2003/0069974 A1 | * | 4/2003 | Lu et al. ....................... 709/226 |
| 2003/0070181 A1 | * | 4/2003 | Holm ........................... 725/134 |
| 2004/0019900 A1 | * | 1/2004 | Knightbridge et al. ........ 725/23 |
| 2004/0261126 A1 | * | 12/2004 | Addington et al. ........... 725/135 |

OTHER PUBLICATIONS

Andrew S. Tanenbaum: "Computer networks (third edition), chapter 3: The data link layer" 1996, Prentice-Hall Ptr, Upper Saddle River, New Jersey 07458 XP002271205 ISBN: 0-13-349945-6.
European Search Report Communication dated Mar. 4, 2004.

* cited by examiner

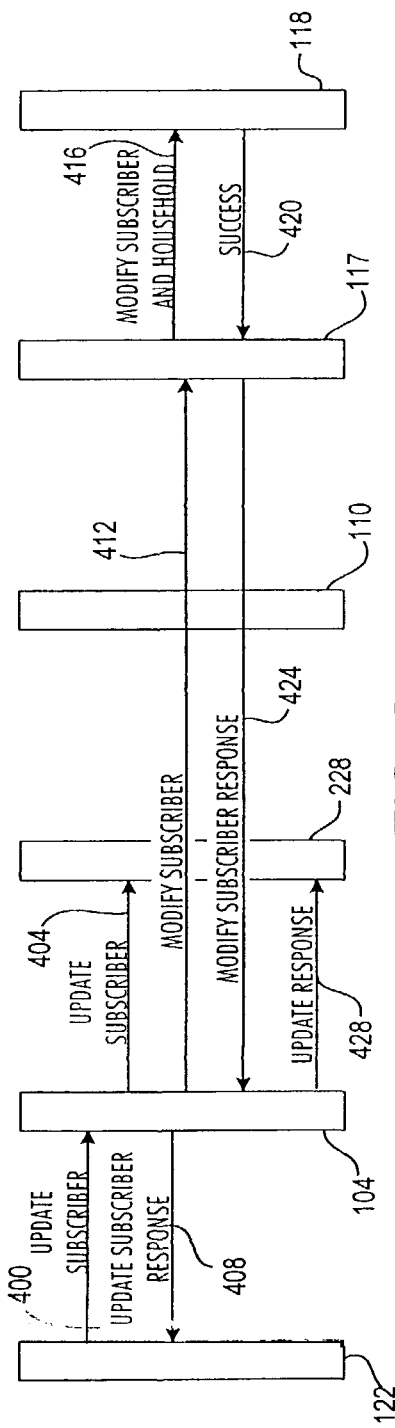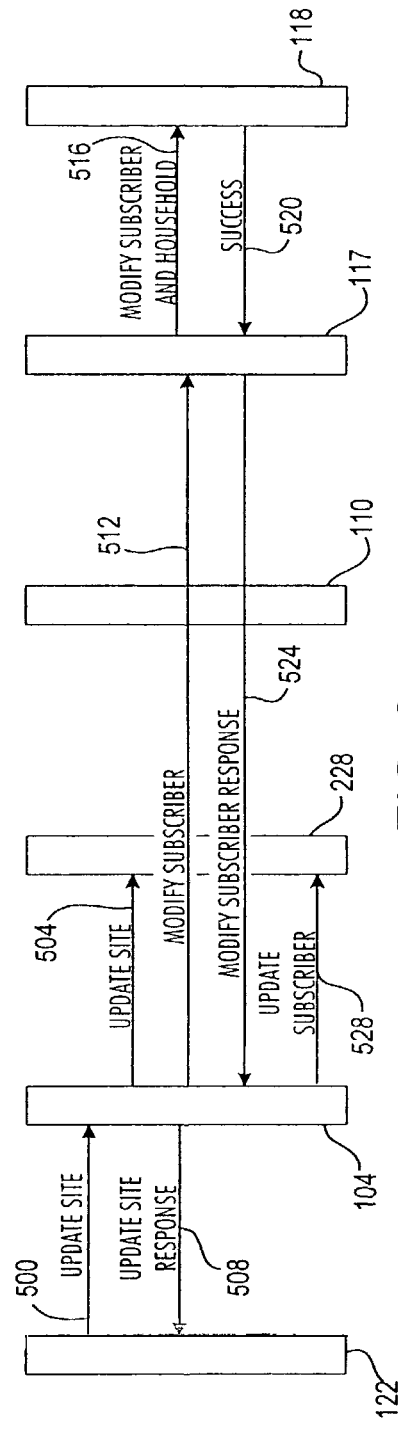

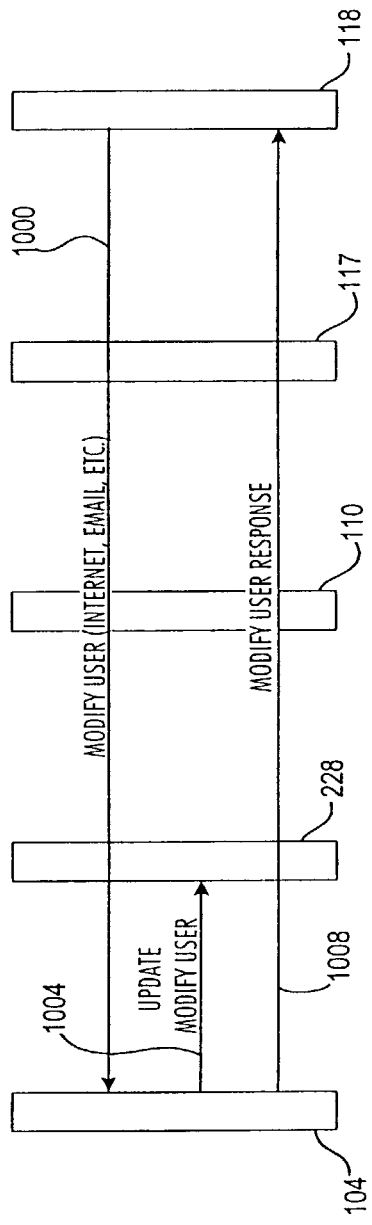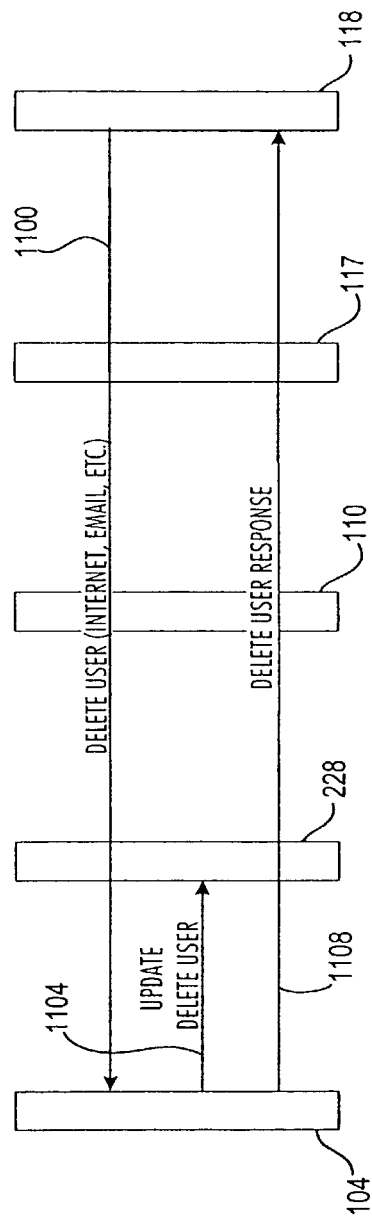

METHOD AND APPARATUS FOR PROVISIONING CLIENT DEVICES CONNECTED TO AN INTERACTIVE TV NETWORK

CROSS REFERENCE TO RELATED APPLICATION

The present application is related to U.S. Patent Application entitled "METHOD AND APPARATUS FOR MANAGING THE PROVISIONING OF CLIENT DEVICES CONNECTED TO AN INTERACTIVE TV NETWORK", Ser. No. 09/671,329, filed Sep. 26, 2000, to Donlan, et al., now U.S. Pat. No. 6,952,836, and U.S. Patent Application entitled "METHOD AND APPARATUS FOR REMOVING CLIENT FROM AN INTERACTIVE TV NETWORK", Ser. No. 10/287,097, filed concurrently herewith, each of which is incorporated herein by this reference.

FIELD OF THE INVENTION

The invention relates generally to a method and apparatus for managing the provisioning of a telecommunication network and specifically to a method and apparatus for managing the provisioning of an interactive television (ITV) network and the associated ITV client devices connected thereto.

BACKGROUND OF THE INVENTION

Implementation and operation of a communications service, whether it be a voice, video or data communications service, requires the interconnection of a plurality of networks, systems, devices and equipment, which may be geographically co-located or separated. Presently, each of these networks, systems, devices and equipment may need to be "provisioned" to enable the establishment of a communications connection path. In general, "provisioning" is the addition of a subscriber (e.g., a subscriber terminal device and/or network component) to, deletion of a subscriber from, or modification of a subscriber's services provided by a network, system, or other type of infrastructure providing entitled services. Provisioning permits the pertinent architecture to recognize and/or communicate with the subscriber.

Some form of provisioning is necessary, whether the communications connection path connects a plurality of subscriber terminal devices (e.g., telephones, televisions, streaming media players, set-top box audio/video decoders, wireless device base station, etc.), as in a telephone, data or audio or video distribution network, or whether the path connects one or more subscriber terminal devices (e.g., work stations, personal computers, PDA, etc.) with one or more servers, as in a client-server computing network. In many operational situations, each of the interconnected plurality of networks, systems, devices and equipment may need to be provisioned independently and separately (either manually with human intervention or automatically), thereby resulting in potential time delays, inefficiencies, or errors in enabling the subscriber terminal to connect to and use the communications network services.

As a type of communications network, an interactive television (ITV) network and subscriber terminal devices connected thereto are "provisioned" to enable the subscriber terminal devices to use ITV services via the ITV network. Subscriber terminal devices, which are ITV client devices connected to the ITV network, may include television sets, set-top audio/video decoder boxes, personal computers, and video recorders, among other video, audio and data devices. The convergence of television transmission networks, IP (i.e., Internet Protocol) data networks, and distributed client-server computing networks to implement an operational ITV network necessitates the interconnection of a plurality of networks, systems, devices and equipment, which may be geographically co-located or separated, as components of the ITV network as a whole. Presently, each of these component interconnected networks, systems, devices and equipment typically are independently and separately "provisioned" to enable the establishment of a communications connection path and the use of the ITV network by an ITV client device (i.e. subscriber terminal) for entitled ITV services.

In interactive television networks, subscribers typically must contact a customer service representative to initiate a modification of information corresponding with their television services. The involvement of the customer service representative often leads to customer dissatisfaction and can cause an unnecessary consumption of resources (and therefore higher operating expenses) by the service provider.

Accordingly, there exists a need for a method and apparatus for commonly (i.e. as a whole) managing the automatic provisioning of these interconnected component networks, systems, devices and equipment comprising the entire ITV network.

SUMMARY OF THE INVENTION

The present invention provides a client-network provisioning manager for managing the provisioning of a telecommunication service network and a plurality of client devices connected to the network for using the telecommunication services. The teachings of the present invention are applicable to a broad variety of subscriber telecommunication services and/or pay-for-use services, including interactive television, cable television, telephone, video, audio, on-line databases, noninteractive television, radio, music video, video juke box, pay-for-view, video-on-demand, home-shopping, video conferences, telephone conferences, interfacing to imaging systems, automatic telephone call charge-backs ("900" numbers) and other telecommunication services. The teachings are also applicable to a variety of telecommunication systems, including multi-channel telecommunication services, single channel multi-service telecommunications, and single channel single service telecommunications. As will be appreciated from the foregoing, the user may be a subscriber or nonsubscriber.

The provisioning manager of the present invention communicates with the individual provisioning methods/apparatus of each of the network components for the purpose of effectuating the overall provisioning of the client devices with the necessary network components in a coordinated, common and automated manner. By knowing the specific provisioning data to collect, where the data is found and is to be forwarded, the provisioning manager acts as an intelligent provisioning data manager by performing as a central collection and dissemination point for the provisioning data, directing provisioning data flows between the provisioning methods/apparatus of the individual network components. As such a central point, the provisioning manager makes the automatic provisioning process more efficient. In one configuration the provisioning manager insures that dependent transactions (of each request/response transaction which are typically handled independently) are made in the correct sequence.

Although the present invention is described as a central collection and dissemination point, the methods and apparatus described may be implemented as an independent unit coupled to the network, or may be distributed throughout the network.

The provisioning manager includes a user interface for use by customer support representative personnel, as well as application programming interfaces ("API(s)"), protocol and signal interfaces to the individual provisioning methods/apparatus of the respective network components. The type of information managed by the provisioning manager includes, but is not limited to, data related to: IP provisioning of the client device for IP communication with the network; centralized provisioning from controlled data centers; support for self-provisioning of capabilities delivered to the client device; subscribers' services enrollment and entitlement; installation of the client device; and the provisioning process flow.

In one network configuration, a customer, subscriber, or other type of user can initiate a provisioning transaction from an interactive television client device ("ITV client device") assigned or associated with the user. This control of the provisioning process by the user can lead to a higher rate of customer satisfaction and less consumption of customer service resources. The latter, of course, leads to lower operating costs by the service provider or network operator.

Message communications transactions between the provisioning manager and the provisioning systems of the other network components, e.g., the billing system, the various servers, the IP data network, and such other network components forming the ITV network, are conducted via appropriate protocol and signal interfaces and APIs defined for each respective network component provisioning system. The message communications transactions are stored in a provisioning manager database.

The teachings of the present invention are particularly applicable to an interactive television (ITV) network having an ITV provisioning manager. The ITV network comprises a plurality of component interconnected networks, systems, devices and equipment. The component interconnected networks, systems, devices and equipment (the "ITV network component(s)") include, but are not limited to, analog or digital television transmission networks, IP (i.e. internet protocol) data networks, distributed client-server computer networks, subscriber management billing systems, and one or more ITV client devices, which may be geographically co-located or separated. ITV client devices include, but are not limited to, set-top video/audio converter decoder boxes, television receivers, video/audio recorders or players, data modems and computers which can process video, audio or data signals for transmission, storage, visual display or sound emission.

In one configuration, operators/providers of the ITV services are different business entities separate, distinct and independent from each of the ITV network component operators/providers.

In one configuration, one or more of the ITV network components has its own independent, respective provisioning methods or apparatus particular to that component's function in the ITV network. Such methods or apparatus may represent only a fractional part of the overall provisioning functions necessary to provision the ITV client devices and/or the ITV network as a whole.

The above-described operation is exemplary, and the individual provisioning and intercommunication of messages between the provisioning manager and the other network components may be conducted in alternative orders of occurrence without departing from the spirit and scope of the present invention. Moreover, the above description of configurations and/or embodiments of the present invention is neither exhaustive nor limiting. As will be appreciated, the features of the present invention can be combined in a variety of other ways, which are within the spirit and scope of the present invention.

BRIEF DESCRIPTION OF THE DRAWINGS

The present invention is described in detail with regards to the following figures, in which like elements are referred to with like numerals, and in which:

FIG. 5 depicts the signal flows for an update subscriber/user transaction;

FIG. 6 depicts the signal flows for an update site transaction;

FIG. 10 depicts the signal flows for the modified user transaction initiated by the subscriber; and FIG. 11 shows the signal flows for a delete user transaction initiated by the subscriber.

DETAILED DESCRIPTION

The ITV Network

Figure 1:
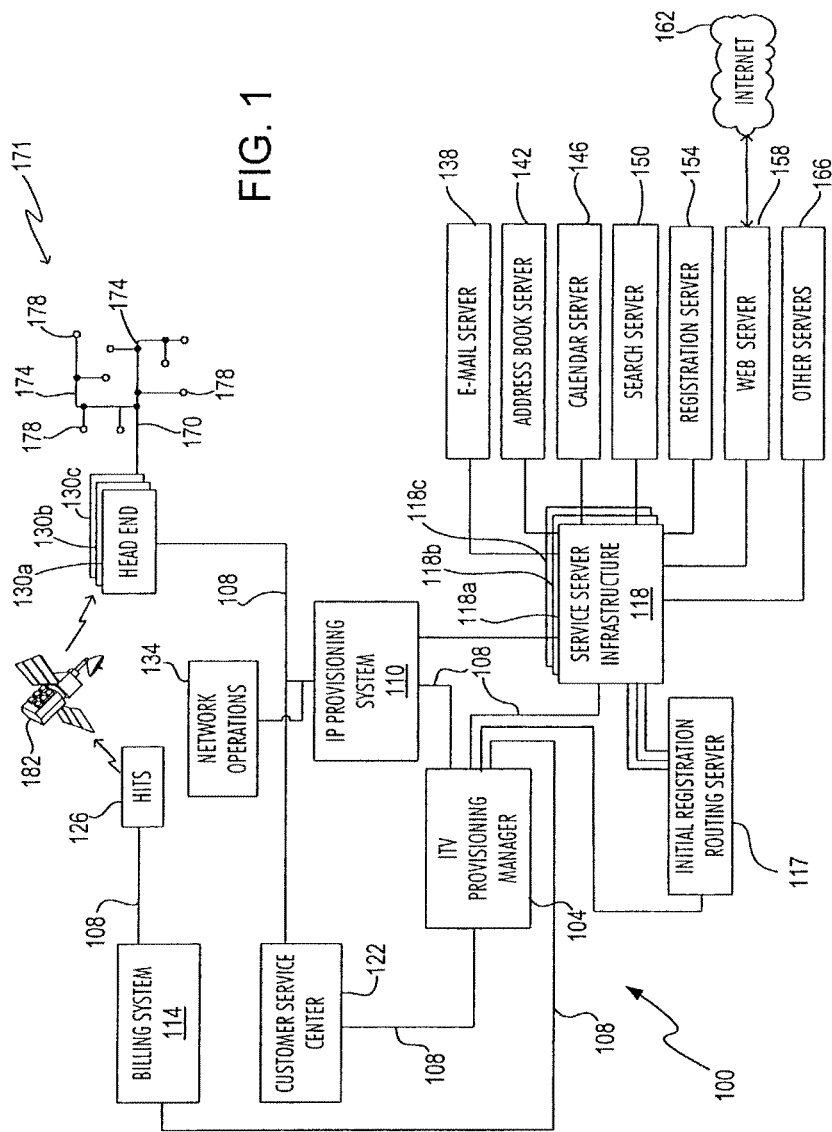
FIG. 1 is an exemplary block diagram of an ITV Network according to a preferred embodiment of the present invention.

FIG. 1 is an exemplary block diagram of an ITV Network 100 according to a preferred embodiment of the present invention. As shown in FIG. 1, the ITV Network comprises a plurality of interconnected networks, systems, devices and equipment, which may be geographically co-located or separated. For the purposes of discussion, these interconnected networks, systems, devices and equipment are referred to collectively as "ITV Network Components" and individually as an "ITV Network Component". Each ITV Network Component may include its own respective provisioning system, method or apparatus; and, for the purposes of discussion, reference to an ITV Network Component includes reference to its respective provisioning system, method or apparatus.

The ITV Provisioning Manager 104, via one or more communications link(s) 108, interconnects and communicates with ITV Network Components including, but not limited to, at least one IP provisioning system 110, at least one subscriber management billing system 114, at least one service server infrastructure 118a-c, customer service center 122, head end in the sky (HITS) 126, one or more head ends 130a-c, and network operations 134, and other required additional ITV Network Components (not shown) comprising the ITV Network 100.

Each of the service server infrastructures 118a-c includes or is connected to a plurality of application, content, and/or control servers. The servers provide or control the provision of selected services to a subscriber. Examples of such servers include an e-mail server 138 to send and receive e-mail, an address book server 142 to enter and retrieve address information from the subscriber's personal records, a calendar server 146 to enter and retrieve calendar or scheduling information from the subscriber's calendaring records, a search server 150 to perform network-related searches, a registration server 154 to register new subscribers in the corresponding server infrastructure, a web server 158 to provide connection to the internet 162, and other servers 166 providing any number of other services (e.g., a home page server, chat server, and messaging server).

The service server infrastructures are each assigned to serve a number of subscribers having selected common attributes. In one configuration, the service server infrastructures each serve subscribers from a unique geographical area.

Each of the head ends 130*a-c* is connected to a distribution network 171 including various feeders 170 and branches 174 and connections to subscriber locations or nodes 178. At each subscriber location or node 178, an ITV client device is located.

Figure 2:
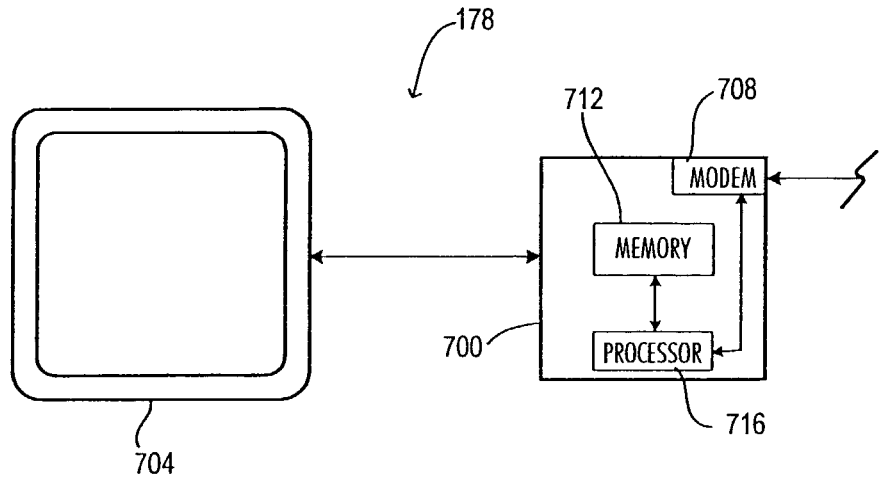
FIG. 2 depicts a configuration of an ITV client device.

FIG. 2 shows the hardware configuration of the typical ITV client device. The ITV client device is typically a set-top box (stb) 700 connected to a television 704. Set-top box 700 typically includes a modem 708, memory 712, and processor 716.

As will be appreciated, an ITV client device can access a number of services. For example, the subscriber can access through device 178 programming material for the subscriber's television 704. The material is transmitted by the HITS 126 via satellite 182 to a head end 130*a-c* and via feeder 170 and branch 174 to the subscriber's client device or set-top box 700. The subscriber can also access the services provided by the service server infrastructure. The services are accessed via branch 174, feeder 170, and link 108.

The numbering of ITV Components 104-166 is not intended to be a limitation on the number of additional ITV Components comprising the ITV Network 100; and the preferred embodiment of the present invention contemplates any number of ITV Network Components comprising the ITV Network 100.

Link(s) 108, feeder(s) 170 and branch(es) 174 may include any combination of one or more wired or wireless, electrical or optical connections or telecommunications data networks, whether packet or circuit switched, global, national, regional, wide-area, local area, or in-home networks, without departing from the spirit and scope of the present invention. Similarly, the IP provisioning system can provision any IP data network that may be implemented on any combination of one or more wired or wireless, electrical or optical connections or telecommunications data networks, whether packet or circuit switched, global, national, regional, wide-area, local area, or in-home networks.

The ITV Provisioning Manager

Figure 3:
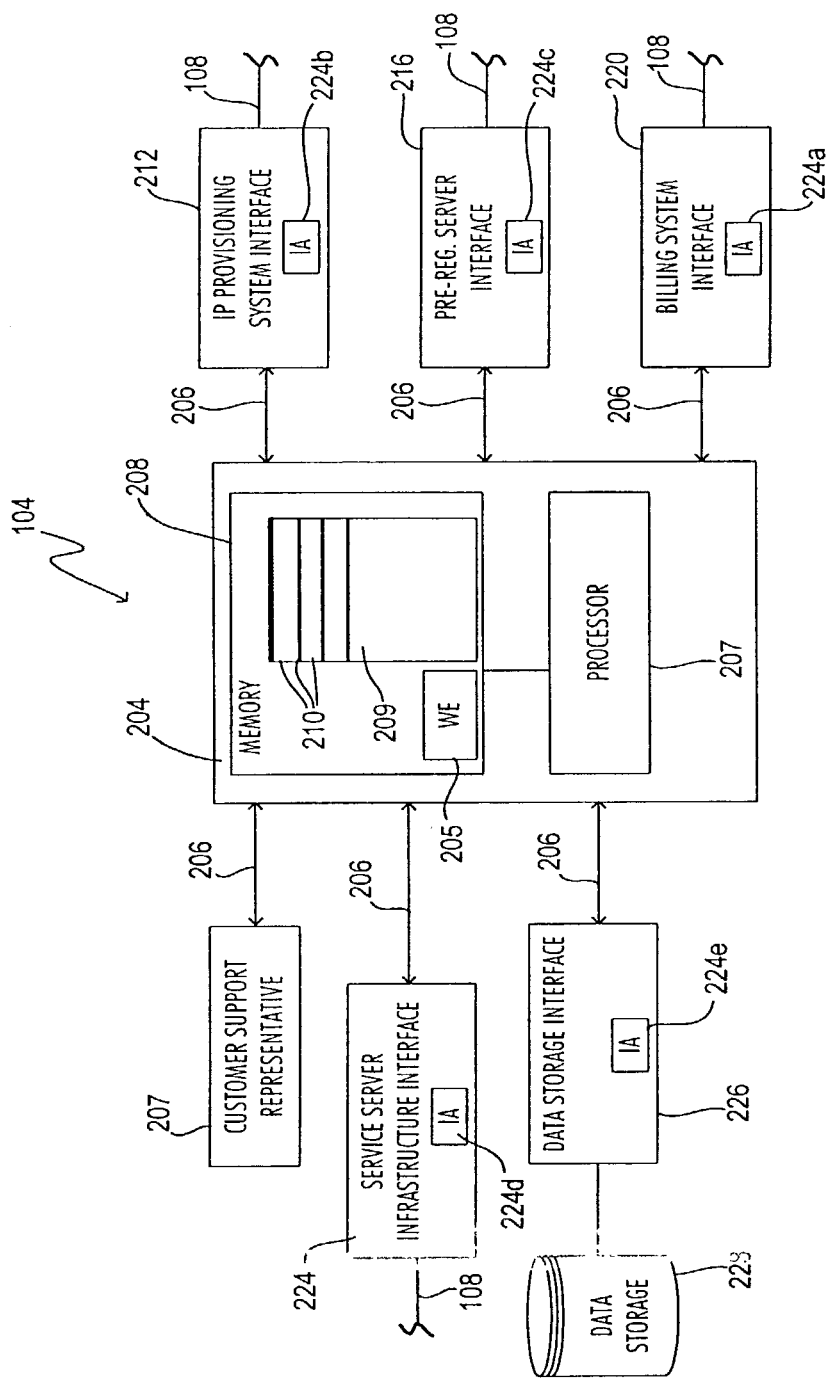
FIG. 3 is an exemplary diagram of provisioning message interfaces of the ITV Provisioning Manager device of FIG. 1.

FIG. 3 is an exemplary block diagram of an ITV Provisioning Manager device 104. The ITV Provisioning Manager device 104 includes a controller 204 (which includes processor 207 and memory 208), an IP provisioning system message interface (server) 212, a service delivery infrastructure message interface (server) 224, a billing system message interface (server) 220, a pre-registration server interface (server) 216 (through which the pre-registration server communicates with the ITV Provisioning Manager 104), data storage interface 226, a communication interface (not shown) with a customer support representative 207 in the customer service center 122, (FIG. 1) and an ITV provisioning data storage 228. As will be appreciated, an "interface" is a connection between two systems through which information is exchanged.

The controller memory 208 includes a workflow engine ("WE") 205 and one or more queues 209 containing one or more transactions 210. The WE 205 performs the service-order workflow instantiation and state management. If the ITV provisioning manager 104 determines that an ITV network component is unavailable during the provisioning process, the manager 104 will suspend or queue the transactions(s) in queue 209 for transmission at a later time. Likewise if the ITV provisioning manager 104 is unavailable, other ITV network components will queue the transactions for transmission at a later time.

Each of the interfaces 212,216,220,224, and 226 include an interface adapter ("IA") 224 that communicates directly with elements such as applications or database servers. Each IA translates tasks into the syntax understood by the element and oversees the execution of operations. In interfaces 212, 220, and 216, the IA 224*b*, 224*a*, and 224*d* further communicate directly with the external application programs. Each IA in these interfaces identifies the business events that require mediation to downstream or upstream components identified as part of the service delivery and management architecture for a service provider. The IA 224*a,b,d* uses the WE 205 to access data storage 228 for a sub-selection of events in order to determine the full impact of an event on a subscriber profile, such as in cases where the message from the billing system 114 does not provide complete service impact scope. For example, the IA 224*a,b,d* receives a request from an external computational component. The IA handles the header (protocol) fields, places the information in the request in the appropriate syntax), validates the request according to predefined criteria, and provides a suitable request or work order to the WE 205 to provide selected information from data storage 228. The WE 205 then executes the work order according to predetermined instructions for the particular transaction type and retrieves the necessary information from data storage 228. The WE then sends the information to the appropriate IA's for each computational component requiring notification of the transaction. The IA then assembles the information in the appropriate order and syntax and adds the pertinent header (protocol) fields to the information and sends the message to the appropriate external computational component or set of computational components for further processing.

Error processing can be handled by the IA and WE in any number of techniques known to those in the art. In one configuration, each of the components backs-up to a log file both a successful receipt of a transaction from an external system or another internal component and a successful send of a transaction to an external system or an internal component to enable roll-back and re-start at a prior step. When the IA becomes unavailable, external systems re-try their requests until the IA becomes available while the WE queues the response in queue 209 until the IA becomes available. This is done because the manager 104 may have already sent back a success response to the billing system. When the IA becomes available, the external system will resend the request if it has not received a reply. The IA will treat a request as a new request and validate it according to standard rules. When the WE becomes unavailable, all transmissions to an IA are continued from the point of entry of the IA request/response to the WE; all transmissions from an IA will continue from the back-up log when the IA request/ response entered the WE; and all transmission to an IA will continue back from the last step in the back-up log done in WE for that workflow. When the IA communicating to data storage 228 becomes unavailable, all transactions will be failed and the external systems will be notified.

Typically, users are initially configured by the ITV provisioning manager 104 based on account and site registration information provided to it by customer service center 122 (FIG. 1). The IA's in each interface then receive the transaction and coordinate with WE to update the database of each service provider (e.g., billing system 114, IP provisioning system 110, and customer service center 122).

The above components are coupled together through control, address and data buses 206. In one configuration, the various links 108 each represent a socket-based synchronous connection.

The various message interfaces 212, 216, 220, and 224 may be a single interface type or a plurality of interface types, each of which communicates messages to an ITV Network Component 110, 117, 114, and 118, respectively, (FIG. 1) using one or more signal types, protocols and APIs (application programming interfaces) appropriate to the appropriate ITV Network Component. The ITV Provisioning Manager 104 in its entirety, or its various components, e.g., the controller 204, message interfaces 212, 216, 220, and 224, or data storage 228, may be implemented as independent units connected to the ITV Network 100, or may be distributed throughout the ITV Network 100, manifested in whole or in part, as a plurality of devices or as constituent parts of other ITV Network Components 104-166. For example and without limiting any location alternatives, the ITV Provisioning Manager 104, in whole or in part, may be located in a cable TV system headend (e.g., headend 130, a telephone central office, a satellite up-link center (e.g., HITS 126), a broadcast studio, a server complex (e.g., service server infrastructure 118), and/or a data center (e.g., billing system 114 and/or customer service center 122).

The controller 204 stores provisioning message communications transactions in one or more database(s) contained in data storage 228. Data storage 228 may include semiconductor memory, as well as magnetic, electrical or optical mass storage devices or combinations thereof, without departing from the spirit and scope of the present invention. In one configuration, data storage 228 is an "ORACLE"™ data-store that serves as the source of current information for all customer account and service profiles required for service activation/deactivation. IA 224e in the data storage interface 226 is typically configured to invoke Structured Query Language (SQL) statements against the data storage 228 to maintain current subscriber device and service profile information.

All provisioning transactions are preferably synchronous, but multiple, independent transactions may be in progress at any one time. Request documents typically consists of a single provisioning transaction and may contain attributes and multiple data elements. A response document typically contains result (status) information, and, if applicable, requested data for the transaction in the request document. Document fragments can be provided for each transaction type. For example, XML documents can be made of elements. Each element can have one or more attributes (metadata) associated with it and can contain either data or other elements.

Figure 4:
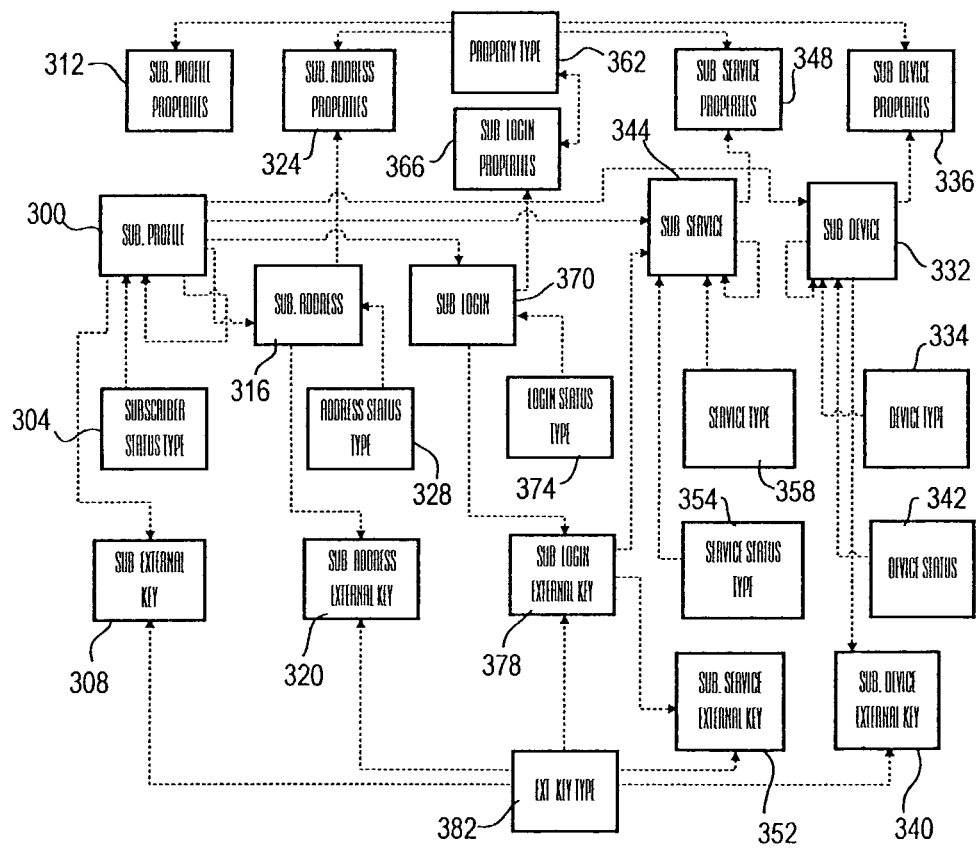
FIG. 4 depicts the data base schema for data storage 228.

In accordance with a preferred embodiment of the present invention, FIG. 4 shows a diagram of a database schema of the database stored on data storage device 228 (FIG. 3). As can be seen from FIG. 4, the database schema includes the following entities: subscriber profile 300, subscriber status type 304, subscriber external keys 308, subscriber profile properties 312, subscriber address 316, subscriber address external keys 320, subscriber address properties 324, subscriber address status 328, subscriber device (the set-top box) 332, subscriber device properties 336, subscriber device external keys 340, device status 342, device type 334, subscriber services 344, subscriber service properties 348, subscriber service external keys 352, service status type 354, service type 358, property type 362, subscriber login properties 366, subscriber login 370, login status type 374, subscriber login external key 378, and external key type 382.

The one or more provisioning message interface(s) 212, 216, 220, and 224 may be implemented using proprietary protocols specially developed for the present invention, or industry-standard protocols widely known in the art, including, but not limited, to any combinations of XML (i.e., extended mark-up language), LDAP (i.e., Light-Weight Directory Protocol), SQL (i.e Structured Query Language), WTVP (i.e., Web TV Protocol), HTTP (i.e., hypertext transport protocol), HTML (i.e., hypertext markup language), DLLS (i.e., dynamic link libraries), ODBC (i.e., Open Database Connectivity), RDBMS (i.e., remote data base management system), RDO (i.e., Remote Data Objects), ADO (i.e., Active-X Data Objects), and COBRA (i.e. Common Object Resource Broker Architecture).

In one preferred embodiment, the IA 224a in interface 220 supports the notification architecture, uses a ServiceBroker™ Message Formatter/Parser based adapter to format and interpret messages, and uses the Synchronous Listener and Sockets Sender (Pure Sockets) protocols; the IA 224b in interface 212 supports shell and pearl script architectures, uses the ServiceBroker™ Message Formatter/Parser based adapter to format and interpret messages, and uses the Synchronous (TCP Socket) protocol; the IA 224c in interface 216 uses the ServiceBroker™ Message Formatter/Parser based adapter to format and interpret XML messages and the synchronous HTTP protocol; the IA 224d in interface 224 uses the ServiceBroker™ Message Formatter/Parser based adapter to format and interpret XML messages and the synchronous HTTP protocol; and the IA 224e in interface 226 is configured to invoke Structured Query Language (SQL) statements against the data storage 228, is configured using ServiceBroker™ Call Invocation Framework over an Oracle™ SQL protocol to format and interpret calls, and uses the synchronous Oracle™ Context protocol.

In operation, the controller 204 communicates through the message interface(s), via the communications link(s) 108, with an ITV Network Component 104-166, data messages containing provisioning-related information including, but not limited to, customer order registration code(s), ITV client device unit address(es), IP address(es), medium access control or MAC address(es), billing system identification number(s), server registration assignment(s), and the like.

The Provisioning Process

Generally, the ITV provisioning manager 104 provides an intelligent service activation flow through by interfacing with operational support systems and business support systems (collectively referred to as "service providers") and the elements, applications and service components that provide the final service to the subscriber and the management of the subscriber's service. The provisioning process for adding a new subscriber (e.g., the create subscriber, create account, create site, create user, etc. commands) is discussed in U.S.

patent application Ser. No. 09/671,329, entitled "METHOD AND APPARATUS FOR MANAGING THE PROVISIONING OF CLIENT DEVICES CONNECTED TO AN INTERACTIVE TV NETWORK", now U.S. Pat. No. 6,952,836, and filed Sep. 26, 2000. The provisioning process for deleting, suspending, or reactivating an existing subscriber is discussed in U.S. Patent Application entitled "METHOD AND APPARATUS FOR REMOVING CLIENT FROM AN INTERACTIVE TV NETWORK", Ser. No. 10/287,097 to Donlan et al., which is filed concurrently herewith.

Through provisioning, the subscriber is provided with a user interface, which is a physical interface such as a set-top box and a graphical user interface, which is presented to the subscriber via television 704 (FIG. 2). The graphical user interface allows the subscriber to register for new or additional instances of services (e.g., add/delete/modify user, etc. commands). These and other transactions are forwarded to the IA 224b corresponding to the IP provisioning system interface 212. The IA 224 coordinates with WE 205 to notify all upstream systems that have registered to be notified of the occurrences of those events.

The description below will discuss the processes in accordance with the preferred embodiment for updating or modifying information relating to the subscriber, updating the site information, deleting a set-top box or astb, and adding/deleting/modifing a user. These transactions are typically referred to as the update subscriber, update site, delete set-top box, add user, modify user, and delete user commands or transactions. The transaction is commenced typically through the customer service center 122 (a "top down" transaction) or by the subscriber/user via the set-top box (a "bottom up" transaction).

In the processes described below, there are a number of interface definitions and restrictions. All data "values" passed into the manager 104 remain in the case in which it was passed. Case changes are preferably not performed by the manager 104. The initial four byte position in the message string indicates the length of the transaction, from the first pipe up to and including the newline character at the end. Position parameters "action" and "type" must appear at the beginning of each string. The position preferably includes a value specifying an action and the second field includes a value specifying the type of object on which the action is to be performed. The remaining provisioning data information appears as <name>=<value> pairs, where <name> is the field name and <value> is the value of the field name for the transaction. Parameters passed in a message to the manager 104, but not configured, as one of the valid parameters for a specific transaction type will be ignored by the application. Parameter propagation to work orders is explicit rather than implicit. All parameters, names, and values are case insensitive. Values are converted to uppercase when inserted into the data storage 228.

Update Subscriber/User Transaction

Referring to FIG. 5, the procedures for the update subscriber(User) transaction in accordance with a preferred embodiment is discussed. The transaction is typically initiated indirectly by a customer service representative in response to the subscriber's request. A subscriber may desire to update his account information, for example, to subscribe to additional services, to terminate his subscription to existing services, to change a user PIN and the like. Although the process is described for a subscriber, it is to be understood that the same steps are applied for modification of a user's information, such as a PIN.

When the subscriber contacts the customer service representative, the customer service representative enters the subscriber identification data and retrieves subscriber data from a subscriber support tool in the billing system. As will be appreciated, the customer service tool is integrated directly with the manager 104 rather than with the billing system. In either case, the representative enters the identification key for the subscriber, and the billing system 114 generates an update subscriber request 400 (which specifies the billing system subscriber account number and subscriber id).

When the update subscriber request 400 is received by the ITV provisioning manager 104, the IA 224a in the billing system interface 220 first determines whether the transaction is valid by verifying the message's use of the correct parameter size, the proper type, the proper value range, the proper format, the proper field condition, and, if the foregoing parameters are verified, determines whether the subscriber identification parameters in the request 400 have a match in data storage 228. If the transaction is valid and the subscriber identification parameters have a match, a work order is created within the IA 224a for the update subscriber request 400 and the work order information is updated in data storage 228 by an update subscriber command 404 conveyed via IA 224e in the data storage interface 226.

An update subscriber response message 408 is returned to the billing system 114, providing pass information or, when the transaction is invalid or the selected criteria does not have a match, fail information.

If the transaction is valid and the criteria has a match, the provisioning manager 104 next forwards a modify subscriber message 412 to the pre-registration server 117. The modify subscriber message 412 includes the subscriber identification data. After verifying the contents of the messages, the server 117 updates its data base (not shown) in response to the messages, and forwards a modify subscriber and household message 416 containing the subscriber identification information to the corresponding service server infrastructure 118 (FIG. 1) serving the subscriber. The infrastructure 118 verifies the contents of the message, and, if properly verified, a server in the infrastructure 118 further initiates transactions with external service providers (e-mail server 138, address book server 142, calendar server 146, etc.) to delete or enable access to the appropriate services by users associated with the subscriber's account. Each service provider involved in the transaction responds with a completion message. When all completion messages are successfully received, the server in the infrastructure 118 updates the infrastructure database (not shown) by modifying the subscriber's records. The infrastructure 118 then forwards a success message 420 to the pre-registration server 117 acknowledging receipt of the message and modification of the subscriber's records in all of the appropriate service providers.

The server 117 forwards a modify subscriber response message 424 to the provisioning manager 104 and further provides an indication whether the success message 420 was verified (pass information) or was not verified (fail information).

Upon receipt of the message, the manager 104 matches the selected fields in the response 424 against the message 412 originally sent and, if a match in the fields is identified, forwards an update message 428 to data storage via interface 226. In response, the appropriate records associated with the subscriber are modified. In some configurations, the manager 104 returns a "success" message (not shown) to the customer service center 122 and/or billing system 114.

Update Site Transaction

Referring to FIG. 6, the procedures for the update site transaction in accordance with a preferred embodiment of the present invention is now discussed. The transaction is initiated by a customer service representative in response to the subscriber's request. Typically, the update site transaction occurs when a subscriber relocates within the geographic area served by the ITV network and his service is transferred to the new location. When the customer service representative initiates the transaction, the customer service representative retrieves the identification data for the subscriber. The representative enters the identification information, and the billing system 114 generates an update site request 500.

When the update site request 500 is received by the ITV provisioning manager 104, the IA 224a in the billing system interface 220 first determines whether the transaction is valid by verifying the message's use of the correct parameter size, the proper type, the proper value range, the proper format, and the proper field condition, and, when the foregoing criteria are valid, determines first whether there is a match for the subscriber identification in data storage 228 for this subscriber and, if so, second whether there is a match for the site information in data storage 228. As will be appreciated, data storage 228 permits only one site to be associated with each subscriber. If the message is valid and the criteria match, a work order is created within the IA 224a for the update site request 500 and the work order information is updated in data storage 228 by an update site message 504 conveyed via IA 224e in the data storage interface 226.

An update site response message 508 is returned to the customer service center 122, providing pass information or, when the message is invalid or the selected criteria have no match, fail information.

The provisioning manager 104 (in response to the receipt of message 500) forwards a modify subscriber message 512 to the pre-registration server 117. The modify subscriber message 512 includes the subscriber identification and site information. After verifying the contents of the messages, the pre-registration server 117 updates its data base (not shown) in response to the messages, and forwards a modify subscriber and household message 516 containing the subscriber identification and site information to the corresponding service server infrastructure 118 serving the subscriber. The infrastructure 118 verifies the contents of the message, and, if properly verified, a server in the infrastructure 118 further initiates transactions with the external service providers (e-mail server 138, calendar server 146, etc.) to alter their records to reflect the site update. Each service responds with a completion message. When completion messages are successfully received, the server updates the infrastructure database (not shown) by updating the site assigned to the subscriber. The infrastructure 118 then forwards a success message 520 to the pre-registration server 117 acknowledging receipt of the message and updating of the site assigned to the subscriber.

The server 117 forwards the modify subscriber response message 524 to the provisioning manager 104. The response message 524 indicates whether the success message 520 was verified (pass information) or was not verified (fail information).

Upon receipt of the message, the manager 104 matches selected fields in the response against corresponding fields in the message 512 and, if a match is identified, forwards an update subscriber message 528 to data storage 228 via interface 226. In one configuration, the manager 104 returns a "success" message (not shown) to the customer service center 122 and/or billing system 114.

Delete Set-Top Box Transaction

Figure 7:
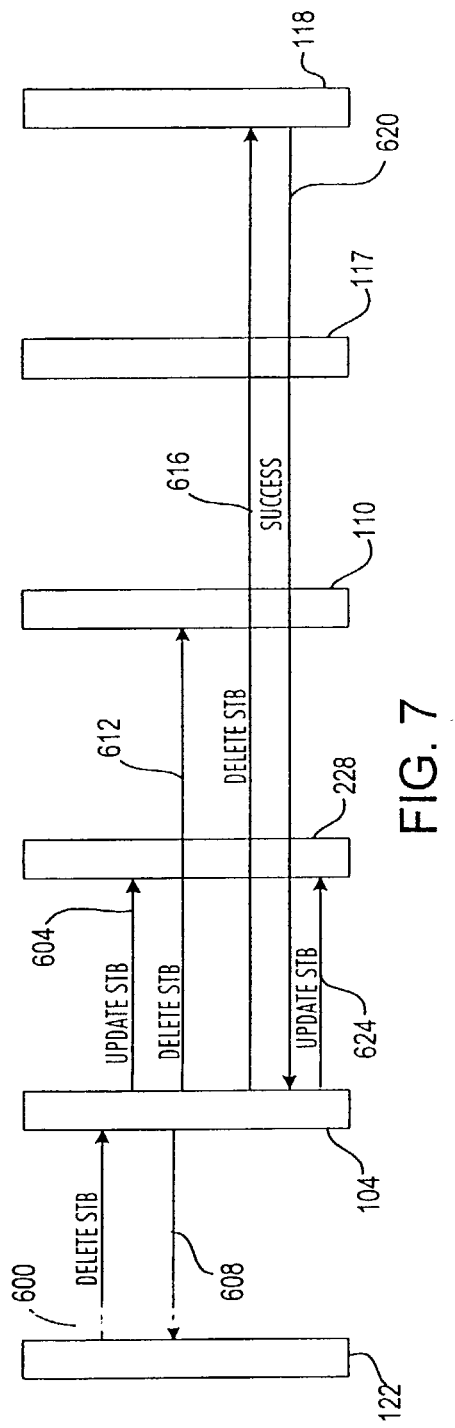
FIG. 7 depicts the signal flows for a delete set-top box transaction.

Referring to FIG. 7, the procedures for the delete set-top box transaction will now be discussed. This transaction occurs where a subscriber returns or otherwise disconnects his set-top box 700. The transaction is initiated by a customer service representative in response to the subscriber's request. When the customer service representative initiates the transaction, the customer service representative retrieves the set-top box identification data for the subscriber from the billing system subscriber support tool. The representative enters the set-top box identification information for the subscriber's set-top box(es) and generates a delete stb request 600.

When the delete stb request 600 is received by the ITV provisioning manager 104, the IA 224a in the billing system interface 220 first determines whether the transaction is valid by verifying the message's use of the correct parameter size, the proper type, the proper value range, the proper format, and the proper field condition, and, when the foregoing criteria are valid, determines whether there is a match for the set-top box identification parameters (set-top box key) in data storage 228 for this subscriber. If the message is valid and a match exists, a work order is created within the IA 224a for the delete stb box request 600, and the work order information is updated in data storage 228 by an update set-top box message 604 conveyed via IA 224e in the data storage interface 226.

A delete stb response message 608 is returned to the customer service center 122, providing pass information or, when the message is invalid or the selected criteria has no match, fail information. The provisioning manager 104 next forwards delete stb messages 612 and 616 to the IP provisioning system 110 and to the service server infrastructures 118, respectively. After each verifies the contents of the messages, the IP provisioning system 110 and infrastructures 118 update their respective data bases (not shown) in response to the messages. A server in each infrastructure 118 further initiates transactions with the external service providers (e-mail server, calendar server, etc.) to remove the set-top box from their respective records. Each service responds with a completion message. When all completion messages are successfully received, the server updates the infrastructure database (not shown) by deleting the set-top box. The infrastructure 118 then forwards a success message 620 to the manager 104 acknowledging receipt of the message and activation of the subscriber and associated users in all appropriate databases of service providers.

Upon receipt of the message, the manager 104 matches selected fields in the response against corresponding fields in the message 616 and forwards an update stb message 624 to data storage via interface 226. In response, the set-top box is deleted from data storage 228. In one configuration, the manager 104 then returns a "success" message (not shown) to the customer service center 122.

Add User Transaction

Figure 8:
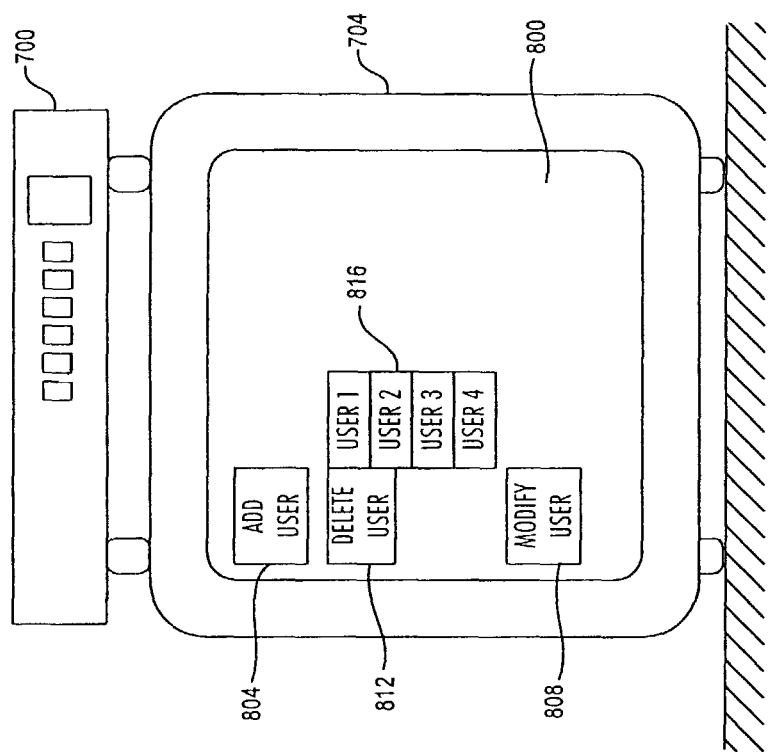
FIG. 8 depicts a transaction selection page rendered by a set top box for a subscriber.

Unlike the above-described transactions which were "top down" transactions initiated by a customer service representative, this transaction is a "bottom up" transaction initiated by a subscriber through his set-top box. The transaction is initiated when a subscriber desires to add one or more user(s) to his account. As will be appreciated, a household often has not one but several users. Referring to FIG. 8, the user invokes an HTML-based settings page 800 rendered by his set-top box 700. The customer chooses the appropriate selection, such as "Add User" 804, on the page 800. The customer enters the new user information, for example, including the PIN, and later reenters the PIN to preclude erroneous data entry. The set-top box (700) forwards the information to a server in the infrastructure 118 (FIG. 1). The server in the infrastructure 118 (FIG. 1) verifies that both entries match. If the entries match, the server stores the new user information and sends a message to the set-top box 700 to display a "success" page to the user. If the entries do not match, the server sends a message to the set-top box 700 to display a request to reenter the PIN until a successful match occurs.

Figure 9:
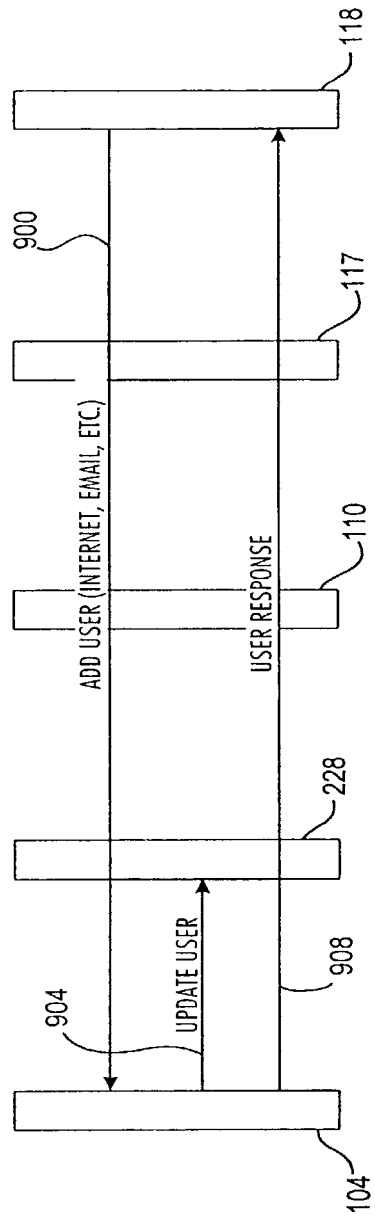
FIG. 9 depicts the signal flows for an add user transaction initiated by a subscriber.

Referring to FIG. 9, when the entries match the server in infrastructure 118 then transmits notification messages to service providers to be accessed by the new user, and, when confirmation messages are received by the infrastructure from each of the service providers, forwards add user message 900 to the manager 104. The manager 104 first verifies that the add user message 900 includes the correct parameter size, the proper type, the proper value range, the proper format, and the proper field condition, and, if valid, determines whether the user identification in message 900 exists within data storage 228, whether the subscriber identification in message 900 exists within data storage 228, and whether the login id value is unique in data storage 228. If the foregoing are valid and the selected criteria have a match, an IA 224d (FIG. 3) in the manager 104 creates a work order for the add user request and sends the work order information to data storage 228 in an update user message 904 to data storage 228 via interface 226 (FIG. 3). In response, data storage 228 updates the subscriber's information to add the new user. The manager 104 then sends user response message 908 providing pass or fail information to the infrastructure 118 servicing the subscriber.

Modify User Transaction

Another bottom up transaction occurs when the subscriber requests via his set-top box that user information (e.g., email address, password or PIN) be changed. Referring to FIG. 8, the user invokes an HTML-based settings page 800 rendered by his set-top box 700. The customer chooses the appropriate selection, such as "Modify User" 808 and/or "Change PIN" (not shown), on the page 800. As will be appreciated, the page 800 could be configured to have each of the various options for one command (e.g., "Modify User") or to have only certain options (e.g., "Change PIN"), or the selection of "Modify User" could cause a second page (not shown) to be rendered by the set-top box 700 with the various options for the "Modify User" command. In the case of a PIN, the customer enters the new PIN and later reenters the PIN to preclude erroneous data entry. The set-top box (700) provides the information to a server in the infrastructure 118 (FIG. 1). The server in the infrastructure 118 (FIG. 1) verifies that both entries match. If the entries match, the server stores the new PIN and displays a "success" page to the user. If the entries do not match, the server has the set-top box display a request to reenter the PIN until a match occurs.

Referring to FIG. 10, the server then transmits notification messages to service providers accessed by the user to be modified, and, when confirmation messages are received by the infrastructure from each of the service providers, forwards modify user message 1000 to the manager 104. The manager 104 first verifies that the modify user message 1000 includes the correct parameter size, the proper type, the proper value range, the proper format, and the proper field condition, and, if valid and the selected criteria have a match, determines whether the user identification in message 1000 exists within data storage 228. If the foregoing are valid, an IA 224d in the manager 104 creates a work order for the modify user request and sends the work order information to data storage 228 in an update modify user message 1004 to data storage 228 via interface 226. In response, data storage 228 updates the subscriber's information to modify the user information. The manager 104 then sends modify user response message 1008 providing pass or fail information to the infrastructure 118 servicing the subscriber.

Delete User Transaction

Finally, a subscriber can cause a user to be deleted from his account. This transaction is a bottom up transaction initiated by the subscriber via his set-top box. As noted, the subscriber invokes an HTML-based settings page 800 (FIG. 8) and selects the "Delete User" selection 812 (FIG. 8). As shown in FIG. 8, the subscriber selects the user to be deleted from a pull-down list 816 of active users 1-4 assigned to his account. The set-top box (700) then forwards the user information for the user to be deleted to a server in the service server infrastructure 118 (FIG. 1) serving the subscriber.

Referring to FIG. 11, the server in the infrastructure 118 updates the infrastructure's database (not shown), transmits notification messages to servers of service providers accessed by the user to be deleted, and, when completion messages are received by the infrastructure from each of the service providers, the server marks the user as deleted in its database and forwards delete user message 1100 to the manager 104.

The manager 104 first verifies that the delete user message 1100 includes the correct parameter size, the proper type, the proper value range, the proper format, and the proper field condition, and, if valid, determines whether the user identification in message 1100 exists within data storage 228. If the foregoing are valid and the selected criteria have a match in data storage 228, an IA 224d (FIG. 3) in the manager 104 creates a work order for the delete user request and sends the work order information to data storage 228 in an update delete user message 1104 to data storage 228 via interface 226. In response, data storage 228 updates the subscriber's information to modify the user information. The manager 104 then sends delete user response message 1108 providing pass information (if the transaction is validated and the selected criteria match) or fail information (if the transaction is not validated and/or the selected criteria do not match) to the infrastructure 118 servicing the subscriber.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. By way of example, the ordering or sequence of the steps may be reversed or rearranged in an order other than that set forth above. Steps may be omitted from the provisioning process. ITV network components described above can be omitted or replaced by other ITV network components. Moreover, the teachings of the present invention are not limited to ITV networks but are extendible to any network offering good(s) or service(s) to subscribers or nonsubscribers. These and other changes may be made without departing from the spirit and scope of the present invention.

What is claimed is:

1. An apparatus comprising:
a processor and memory storing a workflow engine that when executed causes the apparatus to provision a service for a client device in an interactive television (ITV) network, the provisioning by the apparatus causing separate component provisioning in each of a plurality of network components in the ITV network, wherein execution of the workflow engine causes the apparatus, in provisioning the service, to:
queue in the memory a plurality of transactions, each transaction when performed causing transmission of provisioning instructions to the plurality of network components for carrying out the component provisioning; and
perform each transaction queued in the memory, including suspending one of the transactions queued in the memory in response to one of the plurality of network components being unavailable, and re-performing at a later time the suspended one of the transactions.

2. The apparatus according to claim 1, wherein the plurality of network components comprises at least one billing system for a plurality of ITV client devices connected to the ITV network.

3. The apparatus according to claim 1, wherein the plurality of network components comprises at least one ITV server.

4. The apparatus according to claim 1, wherein the plurality of network components comprises a head-end station separately located from the apparatus.

5. The apparatus according to claim 1, wherein the ITV network comprises an Internet protocol (IP) data packet network, and the component provisioning comprises provisioning the client device for IP communication on the IP data packet network.

6. The apparatus according to claim 1, wherein the ITV network comprises an asynchronous transfer mode network.

7. The apparatus according to claim 2, wherein the at least one billing system comprises an ITV server.

8. The apparatus according to claim 3, wherein at least one of the plurality of network components comprises at least one of the following: an e-mail server, an address book server, a calendar server, a search server, a registration server, a web server, and an E-chat server.

9. The apparatus according to claim 1, wherein the client device comprises a set-top box.

10. The apparatus according to claim 1, wherein the client device comprises a television set.

11. The apparatus according to claim 1, wherein the client device comprises a device configured to process video, audio or data signals for transmission, storage, visual display, or sound emission.

12. The apparatus of claim 1, wherein the execution of the workflow engine causes the apparatus, in performing each transaction queued in the memory, to:
insure that each transaction is performed in correct sequence.

13. The apparatus of claim 1, wherein the execution of the workflow engine causes the apparatus, in provisioning the service, to:
receive a request for the service from the client device; and
identify the plurality of network components from a set of network components that require the component provisioning to support the service.

14. The apparatus of claim 1, wherein the provisioning the service comprises:
an update to account access information related to a user account, an update to a user location, a deletion of a set-top box, an addition of a user affiliated with the client device, and a deletion of a user affiliated with the client device.

15. The apparatus of claim 1, wherein the execution of the workflow engine causes the apparatus, in provisioning the service, to:
receive, from the plurality of network components, confirmations that the provisioning instructions were successfully received by the plurality of network components; and
update records associated with the client device in a database in response to the receiving of the confirmations.

16. A method comprising:
provisioning in an interactive television (ITV) network a service for a client device, the provisioning in the ITV network of the service causing separate component provisioning of the service in each of a plurality of network components in the ITV network, the provisioning in the ITV network of the service comprising:
queuing in a memory a plurality of transactions, each transaction when performed causing transmission of provisioning instructions to the plurality of network components for carrying out the component provisioning; and
performing each transaction queued in the memory, including suspending one of the transactions queued in the memory in response to one of the plurality of network components being unavailable, and re-performing at a later time the suspended one of the transactions.

17. The method according to claim 16, further comprising:
receiving a request from a second one of the plurality of network components to perform the provisioning; and
providing a response to the second one of the plurality of network components regarding confirmation that the request has been carried out.

18. The method according to claim 17, further comprising:
providing a first display on a display device connected to the client device, the display including a menu comprising options for at least one of: updating account access information related to a user account, updating a user location, deleting a set-top box, adding a user affiliated with the client device, and deleting a user affiliated with the client device;
detecting a selection from the menu; and
generating the request based on the selection from the menu.

19. The method of claim 16, wherein the performing of each transaction queued in the memory comprises insuring that each transaction is performed in correct sequence.

20. The method of claim 16, the provisioning of the service comprising:
receiving a request for the service from the client device; and
identifying the plurality of network components from a set of network components that require the component provisioning to support the service.

21. The method of claim 16, wherein the provisioning of the service comprises:
updating account access information related to a user account, updating a user location, deleting a set-top box, adding a user affiliated with the client device and deleting a user affiliated with the client device.

22. The method of claim 16, the provisioning of the service comprising:
receiving, from the plurality of network components, responses to the provisioning instructions, the responses indicating that the provisioning instructions were successfully received by the plurality of network components; and
updating records associated with the client device in a database in response to the receiving of the responses.

23. A method comprising:
receiving service information relating to a user of a network that comprises a plurality of separate network components, the service information comprising a request for provisioning the network to provide a service to the user;
determining selected network components of the plurality of network components that are to be individually provisioned to provide the service;
determining a correct sequence of a plurality of transactions for communicating at least some of the service information to each of the selected network components to enable the individual provisioning of the selected network components;
performing the plurality of transactions with the selected network components in the correct sequence, including queuing one or more of the plurality of transactions in a queue in response to one or more of the selected network components being unavailable; and
performing the queued one or more transactions at a later time in response to the one or more selected network components becoming available.

24. The method according to claim 23, further comprising:
storing the service information in a database; and
updating the service information in the database based on receiving responses indicating that the at least some of the service information was successfully received by the selected network components.

25. The method according to claim 23, further comprising:
receiving, from the selected network components, service confirmation information indicative of the service having been provisioned on the selected network components; and
providing the service confirmation information to another network component of the network in response to receiving the service confirmation information from all of the selected network components.

26. The method according to claim 25, wherein the another network component comprises a billing system.

27. The method of claim 23, the performing of each transaction comprising sending a provisioning request to each of the selected network components, the method further comprising:
determining that the one or more selected components are unavailable by not receiving a response to the provisioning request from the one or more selected network components.

28. The method of claim 23, the service comprising one of updating account access information associated with the user, updating a geographic location of a client device associated with the user, deleting the client device associated with the user, and adding the client device associated with the user.

* * * * *

UNITED STATES PATENT AND TRADEMARK OFFICE
CERTIFICATE OF CORRECTION

PATENT NO. : 9,769,531 B2  
APPLICATION NO. : 10/287330  
DATED : September 19, 2017  
INVENTOR(S) : Brian Joseph Donlan et al.

Page 1 of 1

It is certified that error appears in the above-identified patent and that said Letters Patent is hereby corrected as shown below:

On the Title Page

Item (73)
Delete "Comcast Cable Holdings, LLC" and insert --Comcast Cable Communications, LLC--.

Signed and Sealed this
Twenty-sixth Day of November, 2019

Andrei Iancu
*Director of the United States Patent and Trademark Office*

UNITED STATES PATENT AND TRADEMARK OFFICE
CERTIFICATE OF CORRECTION

PATENT NO. : 9,769,531 B2
APPLICATION NO. : 10/287330
DATED : September 19, 2017
INVENTOR(S) : Brian Joseph Donlan et al.

It is certified that error appears in the above-identified patent and that said Letters Patent is hereby corrected as shown below:

In the Specification

Detailed Description, Column 6, Line 17:
Please delete "212,216,220,224," and insert --212, 216, 220, 224,--

Detailed Description, Column 8, Line 23:
Please delete "DLLS" and insert --DLLs--

Signed and Sealed this
Twenty-first Day of March, 2023

Katherine Kelly Vidal
Director of the United States Patent and Trademark Office